US011982206B2

(12) United States Patent
Mizukami et al.

(10) Patent No.: US 11,982,206 B2
(45) Date of Patent: May 14, 2024

(54) COOLING METHOD AND STRUCTURE OF VANE OF GAS TURBINE

(71) Applicant: MITSUBISHI HEAVY INDUSTRIES, LTD., Tokyo (JP)

(72) Inventors: Satoshi Mizukami, Houston, TX (US); David Allen Flodman, Houston, TX (US); Satoshi Hada, Houston, TX (US)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/692,572

(22) Filed: Mar. 11, 2022

(65) Prior Publication Data

US 2023/0287796 A1 Sep. 14, 2023

(51) Int. Cl.
*F01D 5/18* (2006.01)
*F01D 9/04* (2006.01)

(52) U.S. Cl.
CPC ............... *F01D 5/189* (2013.01); *F01D 5/18* (2013.01); *F01D 5/187* (2013.01); *F01D 5/188* (2013.01); *F01D 9/041* (2013.01); *F05D 2220/32* (2013.01); *F05D 2240/12* (2013.01); *F05D 2260/232* (2013.01)

(58) Field of Classification Search
CPC . F01D 5/189; F01D 5/18; F01D 5/187; F01D 5/188; F01D 9/041; F05D 2220/32; F05D 2240/12
See application file for complete search history.

(56) References Cited

U.S. PATENT DOCUMENTS

| | | | | |
|---|---|---|---|---|
| 4,526,226 A * | 7/1985 | Hsia | F01P 1/00 | 165/170 |
| 5,829,245 A * | 11/1998 | McQuiggan | F02C 7/16 | 415/114 |
| 8,517,680 B1 * | 8/2013 | Liang | F01D 5/186 | 416/193 A |
| 8,641,377 B1 * | 2/2014 | Liang | F01D 5/187 | 416/193 A |
| 10,041,374 B2 * | 8/2018 | Spangler | F01D 5/181 | |
| 11,536,149 B1 * | 12/2022 | Mizukami | F01D 9/041 | |
| 2005/0100437 A1 * | 5/2005 | Phillips | F01D 5/186 | 415/115 |
| 2007/0154312 A1 * | 7/2007 | Neuhoff | F01D 5/187 | 416/97 R |

(Continued)

FOREIGN PATENT DOCUMENTS

| | | | |
|---|---|---|---|
| EP | 2365187 A2 * | 9/2011 | F01D 5/187 |
| EP | 2915954 A1 * | 9/2015 | B23P 15/02 |

(Continued)

*Primary Examiner* — Brian Christopher Delrue
(74) *Attorney, Agent, or Firm* — WHDA, LLP

(57) ABSTRACT

A method of cooling a vane of a turbine is provided. The turbine includes an airfoil, an outer shroud disposed at an outer radial end of the airfoil and an inner shroud, the airfoil including a plurality of air channels extending along the radial direction of the turbine, the air channels comprising a first air channel and a second air channel. A cooling air is caused to flow inside the first air channel to cool the first air channel, then cool one of the outer shroud and the inner shroud. A cooling air is caused to flow inside the second air channel to cool the second air channel, then cool the other one of the outer shroud and the inner shroud.

18 Claims, 14 Drawing Sheets

(56) References Cited

U.S. PATENT DOCUMENTS

| | | | | |
|---|---|---|---|---|
| 2016/0017720 | A1* | 1/2016 | Lewis | F01D 5/187 416/1 |
| 2016/0186587 | A1* | 6/2016 | Hagan | F01D 5/189 415/178 |
| 2018/0187554 | A1* | 7/2018 | Hough | F01D 5/187 |
| 2019/0226344 | A1 | 7/2019 | LoRicco et al. | |
| 2021/0277784 | A1* | 9/2021 | Galoul | F01D 5/189 |

FOREIGN PATENT DOCUMENTS

| | | | |
|---|---|---|---|
| JP | H109-177503 | A | 7/1997 |
| JP | 2010-276010 | A | 12/2010 |
| JP | 2013-19348 | A | 1/2013 |
| JP | 2015-059486 | A | 3/2015 |

* cited by examiner

COOLING METHOD AND STRUCTURE OF VANE OF GAS TURBINE

TECHNICAL FIELD

The present disclosure relates to a cooling method of a stator vane of a gas turbine, and also relates to a cooling structure of a stator vane of a gas turbine.

BACKGROUND

A stator vane of a gas turbine and a rotor blade of the gas turbine are exposed to high temperature combustion gas. Thus, the stator vane and the rotor blade are cooled by cooling air. For example, Japanese Unexamined Patent Application Publication No. 2013-019348 (JP '348) describes cooling of a turbine static blade. FIG. 3 of JP '348 describes that cooling gas RG first flows into an outer shroud 12, then flows down into a blade body 11 and is ejected through a plurality of apertures 223 to cool the blade body 11, then flows down toward an inner shroud 13, flows into the inner shroud 13 to cool the inner shroud 13. In other words, FIG. 3 of JP '348 first cools the outer shroud 12, then cools the blade body 11 by using the cooling gas RG which has cooled the outer shroud 12, then cools the inner shroud 13 by using the cooling gas RG which has cooled the blade body 11.

SUMMARY

Recently, gas turbine inlet temperature is increased, and thus, it is desirable to further facilitate cooling of the first stage stator vane. One of approaches to address the above is to supply cooling air with higher pressure and lower temperature (compared to conventional technology) to the first stage stator vane. According to the study by inventors, in a case when the cooling air with higher pressure and lower temperature is used for cooling the first stage stator vane, even after the cooling air is used for cooling an airfoil or a shroud edge, there is a possibility that the cooling air may be re-used for cooling other elements or components of the first stage stator vane. However, in the conventional technology, efficiency of use of the cooling air is limited.

It is desirable to provide a cooling method or cooling structure of a stator vane of a gas turbine which enables better efficiency of use of cooling air.

According to a first aspect of the present disclosure, there is provided a method of cooling a vane of a turbine, the turbine comprising an airfoil, a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a first air channel and a second air channel. The method comprises steps of:

(i) causing a cooling air to flow inside the first air channel to cool the first air channel, then cooling one of the outer shroud and the inner shroud by using the cooling air which has flowed inside the first air channel; and (ii) causing a cooling air to flow inside the second air channel to cool the second air channel, then cooling the other one of the outer shroud and the inner shroud by using the cooling air which has flowed inside the second air channel.

With the above-described feature, the cooling air used for cooling the airfoil may be used for cooling other components of the stator vane such as the outer shroud or the inner shroud without ejecting the cooling air into a hot gas passage. Thus, it becomes possible to improve efficiency of use of cooling air. Also, the outer shroud and the inner shroud may be cooled by using relatively lower temperature cooling air just after cooling the airfoil. Moreover, the cooling air used for cooling the first air channel may be used for cooling one of the outer shroud or the inner shroud, and the cooling air used for cooling the different air channel may be used for cooling different one of the outer shroud or the inner shroud. Thus, it becomes possible to improve efficiency of use of cooling air.

According to a second aspect of the present disclosure, there is provided a vane of a turbine comprises an airfoil; and a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine. The airfoil comprises a plurality of air channels extending along the radial direction of the turbine, the air channels comprising a first air channel and a second air channel. The airfoil comprises an air inlet configured to introduce cooling air from outside of the vane to the first air channel and the second air channel. The first air channel is communicated with one of the outer shroud and the inner shroud to cause the cooling air introduced to the first air channel to flow toward the one of the outer shroud and the inner shroud to cool the one of the outer shroud and the inner shroud. The second air channel is communicated with the other one of the outer shroud and the inner shroud to cause the cooling air introduced to the second air channel to flow toward the other one of the outer shroud and the inner shroud to cool the other one of the outer shroud and the inner shroud.

With the above-described feature, the cooling air used for cooling the airfoil may be used for cooling other components of the stator vane such as the outer shroud or the inner shroud without ejecting the cooling air into a hot gas passage. Thus, it becomes possible to improve efficiency of use of cooling air. Also, the cooling air is introduced to the air channels first to cool the airfoil and the outer shroud and the inner shroud may be cooled by using relatively lower temperature cooling air just after cooling the airfoil. Moreover, the cooling air used for cooling the first air channel may be used for cooling one of the outer shroud or the inner shroud, and the cooling air used for cooling the different air channel may be used for cooling different one of the outer shroud or the inner shroud. Thus, it becomes possible to improve efficiency of use of cooling air.

BRIEF DESCRIPTION OF THE DRAWINGS

The advantages of the disclosure will become apparent in the following description taken in conjunction with the following drawings.

DESCRIPTION OF THE PREFERRED EMBODIMENTS

Figure 1:
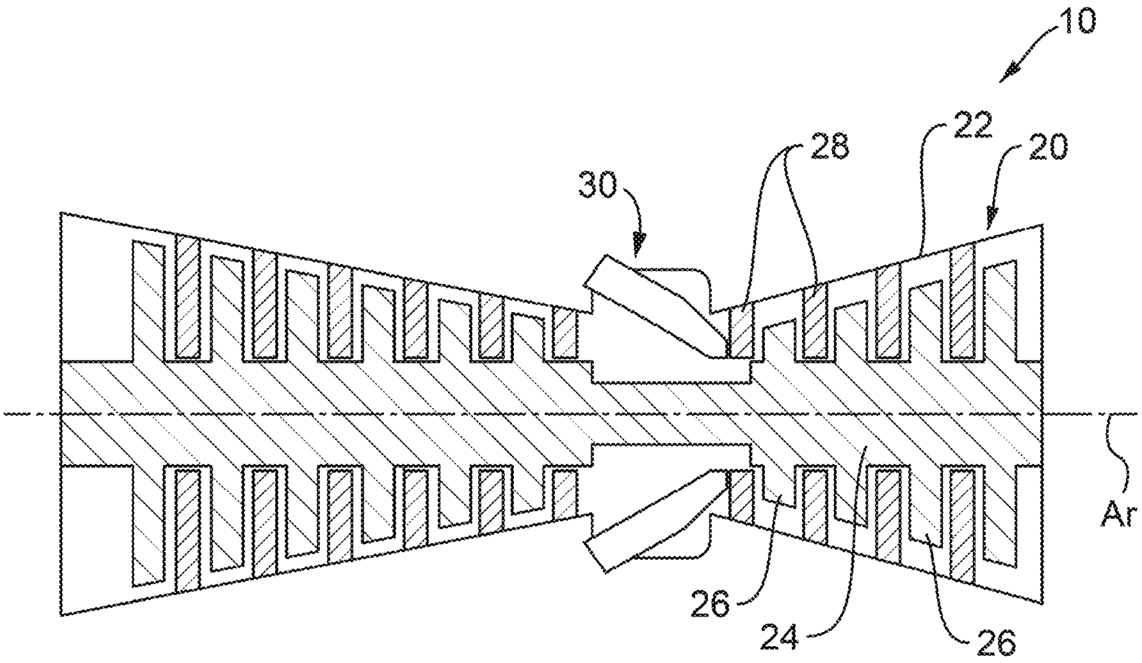
FIG. 1 is a schematic sectional view of a gas turbine in an embodiment according to the present disclosure.

A preferred embodiment of the present disclosure will be described in detail below with reference to the drawings. FIG. 1 is a schematic sectional view of a gas turbine in an embodiment according to the present disclosure. As shown in FIG. 1, a gas turbine 10 of this embodiment includes a turbine 20 driven by combustion gas generated by a combustor 30. The turbine 20 has a rotor shaft 24, a turbine rotor 26 that rotates around an axis Ar, a turbine casing 22 that covers the turbine rotor 26, and a plurality of stator vane stages 28.

Figure 2:
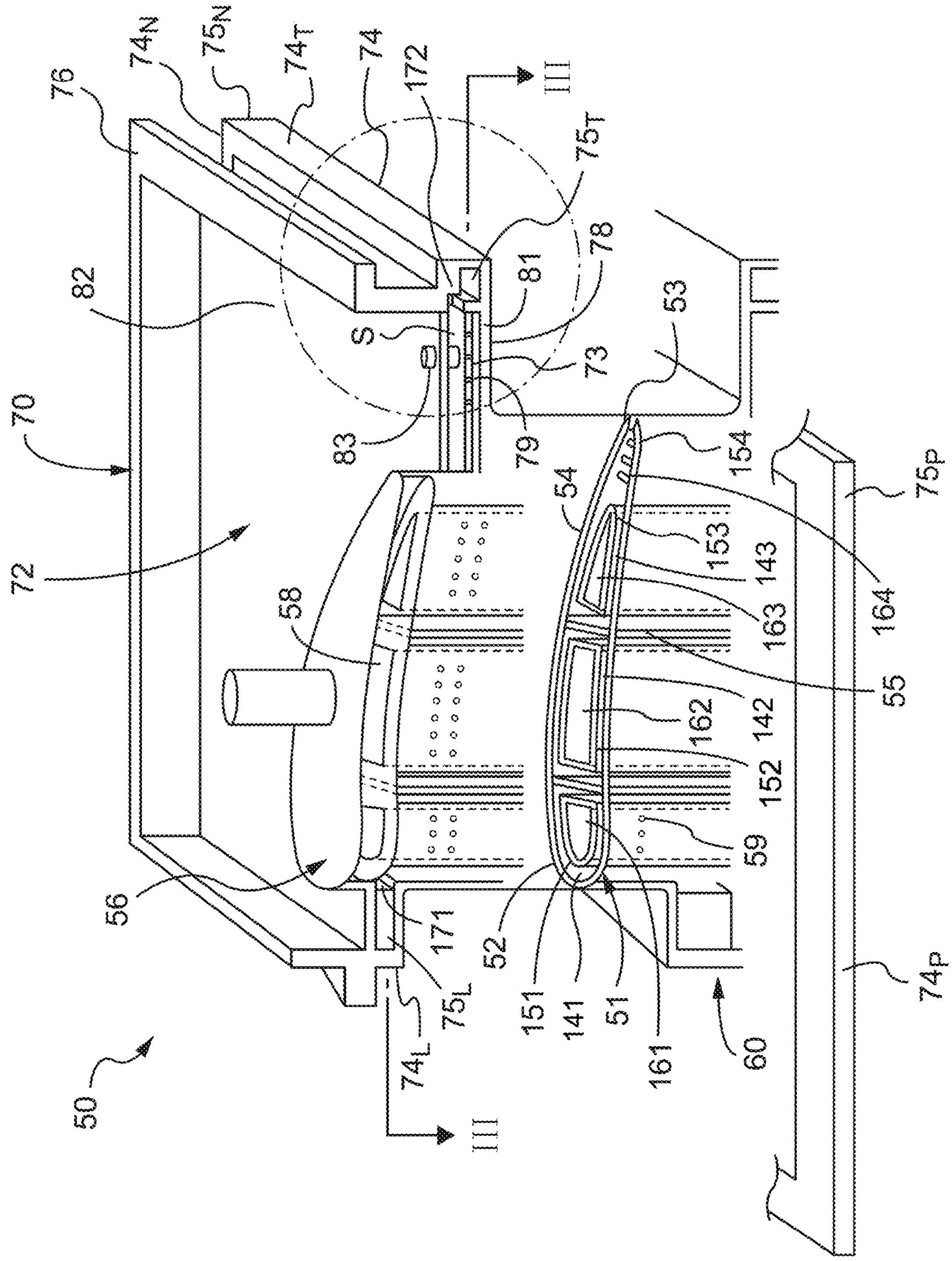
FIG. 2 is a perspective view of a stator vane in a first embodiment.
Figure 3:
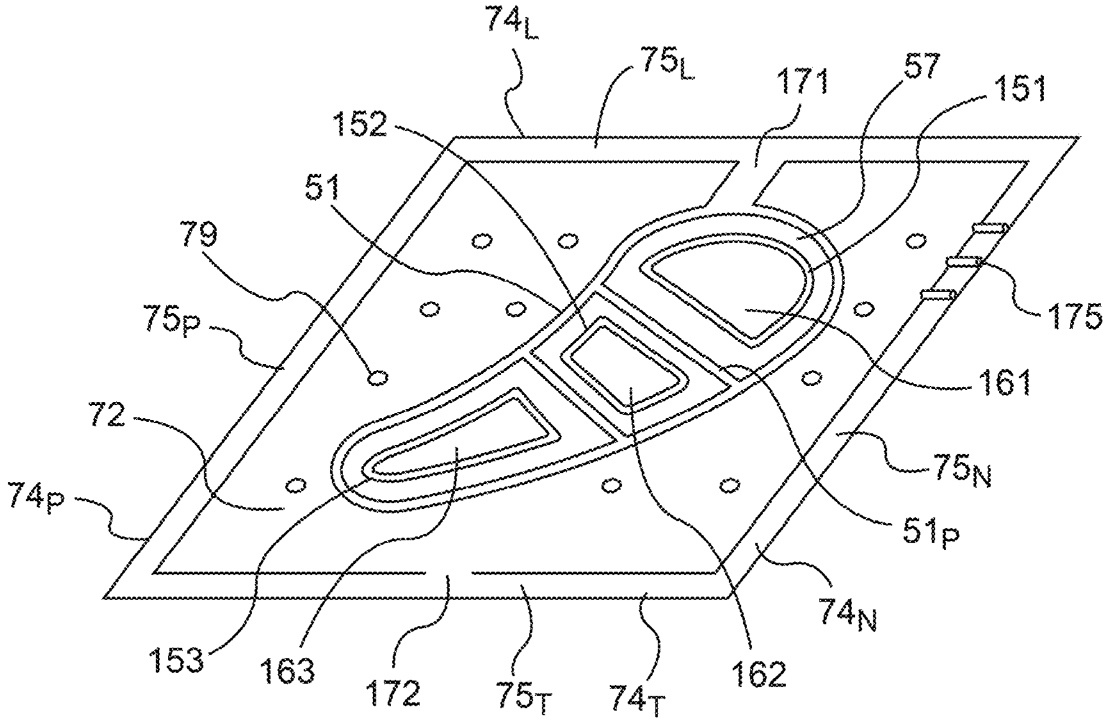
FIG. 3 is a sectional view taken along the line III-III of FIG. 2.
Figure 4:
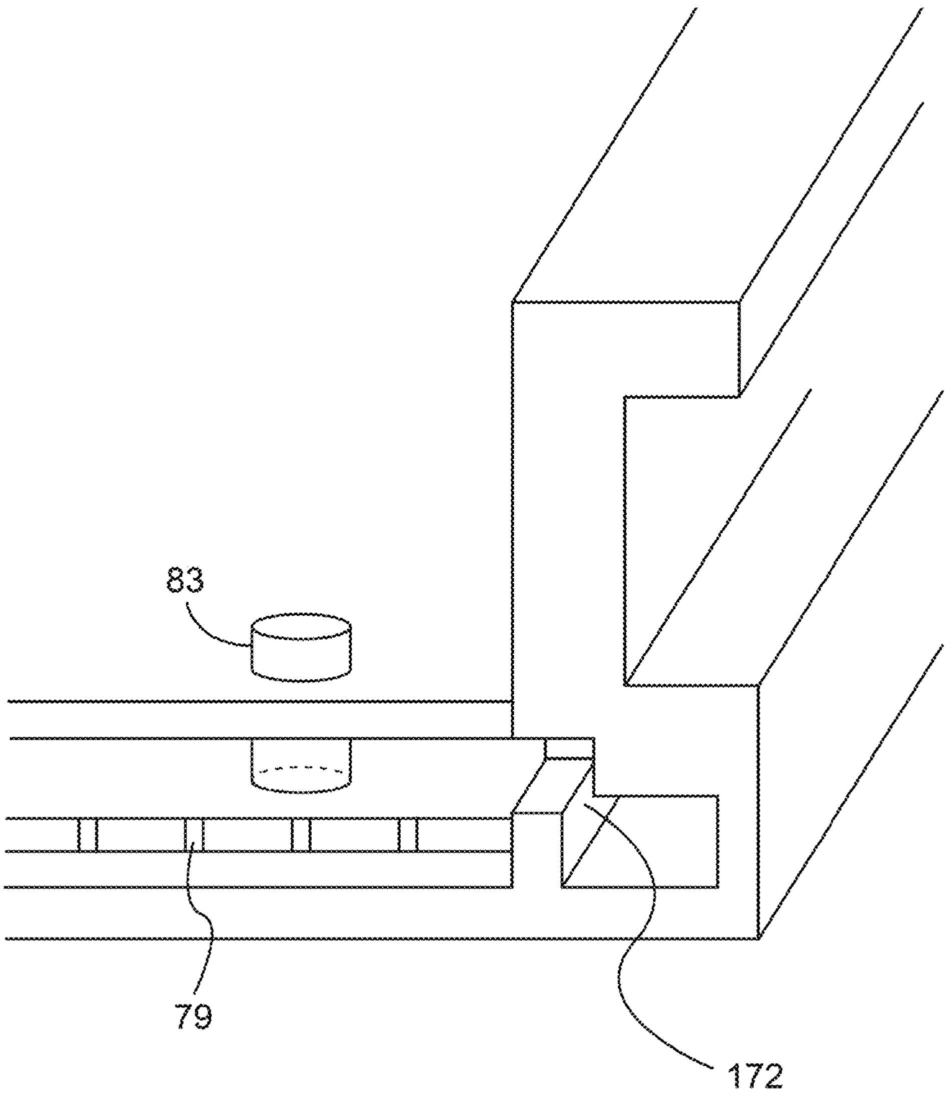
FIG. 4 is a partial enlargement view of the stator vane.

FIG. 2 schematically illustrates a stator vane of a gas turbine according to an embodiment of the present disclosure. FIG. 2 is a perspective view of a stator vane in a first embodiment. FIG. 3 is a sectional view taken along the line III-III of FIG. 2. FIG. 4 is a partial enlargement view of the stator vane. As shown in FIG. 2, a stator vane 50 includes a vane body (airfoil) 51 extending in a radial direction of a gas turbine, an inner shroud 60 disposed on the radially inner side of the vane body 51, and an outer shroud 70 disposed on the radially outer side of the vane body 51. The vane body 51 is disposed in a combustion gas flow passage (hot gas passage) through which the combustion gas passes. Generally, an annular combustion gas flow passage is defined by the inner shroud 60 on the radially inner side thereof and by the outer shroud 70 on the radially outer side thereof. The inner shroud 60 and the outer shroud 70 are plate-shaped members which define a part of the combustion gas flow passage.

As shown in FIG. 2, an end of the vane body 51 on the upstream side has a leading edge 52, and an end of the vane body 51 on the downstream side has a trailing edge 53. Among surfaces of the vane body 51, a convex surface is a suction-side surface 54 (negative pressure surface) and a concave surface is a pressure-side surface 55 (positive pressure surface). For the convenience purpose, in the following descriptions, the pressure side (positive pressure-surface side) of the vane body 51 and the suction side (negative pressure-surface side) of the vane body 51 will be referred to as a pressure side and a suction side, respectively.

The inner shroud 60 and the outer shroud 70 have basically the same structure. Therefore, the outer shroud 70 will be described primarily below.

As shown in FIG. 2 and FIG. 3, the outer shroud 70 is a plate-shaped shroud member which comprises a shroud main body 72, a shroud edge 74 disposed on a circumference of the shroud main body 72, and a peripheral wall 76 that extends along the shroud edge 74 and protrudes from the shroud main body 72 toward the radially outer side of the gas turbine.

The outer shroud 70 has a leading end surface being an end surface on the upstream side, a trailing end surface being an end surface on the downstream side, a pressure-side end surface being an end surface on the pressure side, a suction-side end surface being an end surface on the suction side. The outer shroud 70 has a gas path surface 78 facing the radially inner side and facing the hot gas passage. The leading end surface and the trailing end surface are substantially parallel to each other. The pressure-side end surface and the suction-side end surface are substantially parallel to each other. Thus, when seen from the radial direction, the outer shroud 70 has a substantially parallelogram shape as shown in FIG. 3.

The shroud edge 74 is a brim or rim shaped structure projecting from the shroud main body 72. The shroud edge 74 includes a leading-side shroud edge $\mathbf{74}_L$ disposed on the upstream side of the outer shroud 70, a trailing-side shroud edge $\mathbf{74}_T$ disposed on the downstream side of the outer shroud 70, a suction-side shroud edge $\mathbf{74}_N$ disposed on the suction side of the outer shroud 70, and a pressure-side shroud edge $\mathbf{74}_P$ disposed on the pressure side of the outer shroud 70. For example, as shown by FIG. 3, the leading-side shroud edge $\mathbf{74}_L$, the trailing-side shroud edge $\mathbf{74}_T$, the suction-side shroud edge $\mathbf{74}_N$, and the pressure-side shroud edge $\mathbf{74}_P$ are disposed on a circumference of the shroud main body 72 to entirely surround the shroud main body 72.

The leading-side shroud edge $\mathbf{74}_L$ includes a leading-side shroud edge passage $\mathbf{75}_L$ inside thereof. The trailing-side shroud edge $\mathbf{74}_T$ includes a trailing-side shroud edge passage $\mathbf{75}_T$ inside thereof. The suction-side shroud edge $\mathbf{74}_N$ includes a suction-side shroud edge passage $\mathbf{75}_N$ inside thereof. The pressure-side shroud edge $\mathbf{74}_P$ includes a pressure-side shroud edge passage $\mathbf{75}_P$ inside thereof.

In this embodiment, the leading-side shroud edge passage $\mathbf{75}_L$ is communicated with the suction-side shroud edge passage $\mathbf{75}_N$ at one end thereof and communicated with the pressure-side shroud edge passage $\mathbf{75}_P$ at the other end thereof. The trailing-side shroud edge passage $\mathbf{75}_T$ is communicated with the suction-side shroud edge passage $\mathbf{75}_N$ at one end thereof and communicated with the pressure-side shroud edge passage $\mathbf{75}_P$ at the other end thereof. As shown by FIG. 2, FIG. 3 and FIG. 4, the leading-side shroud edge passage $\mathbf{75}_L$ has a shroud edge passage inlet 171. The trailing-side shroud edge passage $\mathbf{75}_T$ has a shroud edge passage outlet 172. Part of cooling air which flows into the leading-side shroud edge passage $\mathbf{75}_L$ through the shroud edge passage inlet 171 flows through the suction-side shroud edge passage $\mathbf{75}_N$ and the pressure-side shroud edge passage $\mathbf{75}_P$, then flows through the trailing-side shroud edge passage $\mathbf{75}_T$, and then, flows out from the shroud edge passage outlet 172. As shown by FIG. 3, the shroud edge passages $\mathbf{75}_L$, $\mathbf{75}_T$, $\mathbf{75}_P$, $\mathbf{75}_N$ include turbulators 175. The turbulator 175 may be a rib disposed on an inner surface of the shroud edge passages. To enhance cooling of the shroud edge, the turbulator 175 may be disposed on a bottom surface of the passage which defines a radially inner side of the passage. Here, the bottom surface of the passage may be extended substantially parallel to the radially inner wall 81. Also, the turbulator 175 may be disposed on a side surface of the passage which defines an outer lateral side of the passage.

In the present embodiment, the shroud edge passage inlet 171 is provided to the leading-side shroud edge passage $\mathbf{75}_L$ and the shroud edge passage outlet 172 is provided to the trailing-side shroud edge passage $75_T$. However, the structure of the stator vane is not limited to this embodiment. The shroud edge passage inlet 171 may be provided to other shroud edge passage such as the suction-side shroud edge passage $75_N$, the pressure-side shroud edge passage $75_P$, or the trailing-side shroud edge passage $75_T$. The shroud edge passage outlet 172 may be provided to other shroud edge passage such as the suction-side shroud edge passage $75_N$, the pressure-side shroud edge passage $75_P$, or the leading-side shroud edge passage $75_L$. Alternatively, a plurality of the shroud edge passage inlets 171 may be provided to either one or more of the shroud edge passages $75_L$, $75_T$, $75_N$, $75_P$. Moreover, a plurality of the shroud edge passage outlets 172 may be provided to either one or more of the shroud edge passages $75_L$, $75_T$, $75_N$, $75_P$.

The shroud main body 72 comprises a radially inner wall 81 and a radially outer wall 82 opposite to the radially inner wall 81. The shroud main body 72 contains a hollow space S inside thereof between the radially inner wall 81 and the radially outer wall 82. The radially inner surface of the inner wall 81 constitutes the gas path surface 78 of the outer shroud 70. The radially inner wall 81 constitutes a part of the shroud main body 72. The radially inner wall 81 may be continuously extended outward to constitute a part of the shroud edge 74. FIG. 2 describes, as an embodiment, that the radially inner wall 81 is continuously extended outward to constitute a part of the trailing-side shroud edge $74_T$. The shroud main body 72 contains an impingement plate 73 that partitions the space S of the outer shroud 70 into an outer region on the radially outer side and an inner region (cavity) that is a region on the radially inner side. The outer region is connected to the shroud edge passage outlet 172 such that part of cooling air flows from the trailing-side shroud edge passage $75_T$ into the outer region. The inner region is defined between the impingement plate 73 and the radially inner wall 81 of the outer shroud 70.

In the impingement plate 73, a plurality of air holes 79 are provided to extend through the impingement plate 73 in the radial direction. Part of cooling air present in the outer region flows into the inner cavity through the air holes 79 of the impingement plate 73. The cooling air is jetted from air holes 79 toward a radially outer surface of the radially inner wall 81 for impingement cooling of the radially outer surface of the radially inner wall 81, and then, is ejected through the radially outer wall 82 toward the outer side of the outer wall 82. For example, the cooling air is jetted from air holes 79 toward a radially outer surface of the radially inner wall 81 for impingement cooling of the radially outer surface of the radially inner wall 81, and then, is ejected through a passage which connects the inner region (cavity) of the hollow space (S) and an outside space located on the opposite side of the radially outer wall 82 with respect to the hollow space (S). Such a passage may be isolated from the outer region of the hollow space (S). More specifically, in this embodiment, the cooling air is ejected through a hole of an exit conduit 83. The exit conduit 83 is provided to penetrate through the radially outer wall 82 and the impingement plate 73 to connect the inner region and the outside space.

Airfoil

The vane body 51 comprises a plurality of air channels 141, 142, 143. More specifically, inside of the vane body 51 is partitioned by radially extending partition walls $51_P$ into the plurality of air channels 141, 142, 143 (one of them may be referred to as "one air channel," and another one of them may be referred to as "another air channel"). A plurality of inserts 151, 152, 153 are inserted into the respective air channels 141, 142, 143. The plurality of inserts 151, 152, 153 which include respective radially extending inner air channels 161, 162, 163 extend in the radial direction from the outer shroud 70 through the vane body 51 to the inner shroud 60. Each of the inserts 151, 152, 153 is formed continuously from the outer shroud 70 through the vane body 51 to the inner shroud 60. Each of the inner air channels 161, 162, 163 has an air inlet 58 open to the inside of an intake manifold 56.

Each of the inserts 151, 152, 153 has a plurality of apertures (through holes) 59 communicated with the respective inner air channels 161, 162, 163. Part of cooling air which is supplied to the inner air channels 161, 162, 163 of the inserts 151, 152, 153 is jetted from the plurality of apertures 59 toward an inner surface of the vane body 51 for impingement cooling of the inner surface of the airfoil 51. The plurality of air channels 141, 142, 143 have respective outer air channels defined between the inserts 151, 152, 153 and the inner surface of the vane body 51. The part of cooling air which is jetted through the apertures 59 is guided by and flows through the outer air channels in the radially outer direction, in the radially inner direction, or in both the radially outer and inner directions through the outer air channels. As an example, FIG. 3 shows the outer air channel 57 between the side surface of the insert 151 and the inner surface of the leading end part of the vane body 51.

Figure 14:
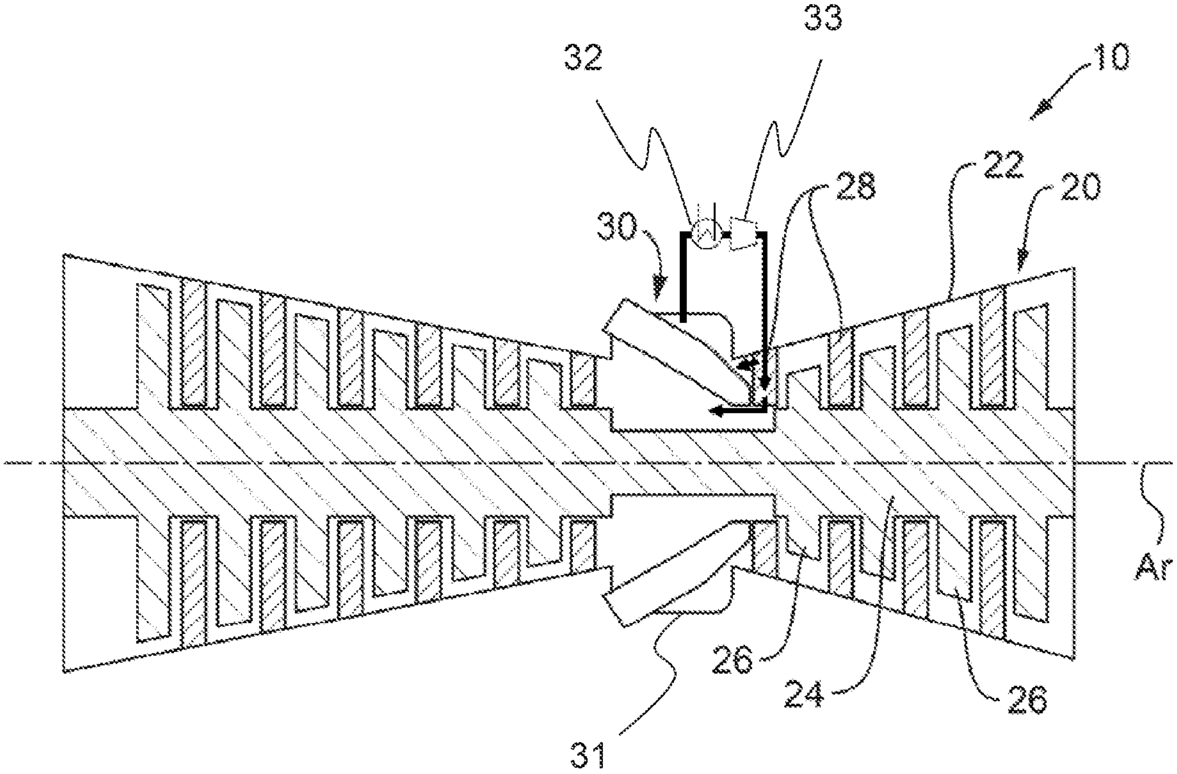
FIG. 14 is a schematic sectional view of one embodiment of a gas turbine.

The intake manifold 56 and the exit conduit 83 are connected to a forced air cooling system in which cooling air extracted from an inside of a combustor casing 31 is cooled by an external cooler 32 (see FIG. 14), and then, compressed by an external compressor 33 (see FIG. 14). The compressed air is used for cooling and then returned to the inside of the combustor casing 31. In the above-description, the air cooling system is applied to the present embodiment. However, the present stator vane is not limited to such embodiment. The present disclosure may be applied to other type of cooling system. For example, the intake manifold 56 and the exit conduit 83 may be connected to a closed-loop steam cooling system or closed-loop air cooling system. The compressed air used for cooling is supplied to the intake manifold and directly provided to the air inlet 58 first without going through the shroud main body 72 nor the shroud edge 74. In other words, the cooling air is first used for cooling the airfoil 51 before used for cooling the shroud main body 72 or the shroud edge 74.

In the present embodiment, the air channel 141 is a leading end air channel positioned at an upstream end of the vane body 51. For example, in the insert 151 which is a leading end insert, part of cooling air which is supplied to the inner air channel 161 through the air inlet 58 is jetted through the apertures 59 toward the inner surface of the leading end part of the airfoil 51, and then is guided to flow in the radially outer direction through the outer air channel 57. The outer air channel 57 which is a space between the insert 151 and the inner surface of the leading end part of the vane body 51 is communicated with the shroud edge passage inlet 171 of the leading-side shroud edge passage $75_L$. The part of cooling air which is jetted toward the inner surface of the leading end part of the airfoil 51 flows into the shroud edge passage inlet 171 of the leading-side shroud edge passage $75_L$ through the outer air channel 57 which is connected to the shroud edge passage inlet 171.

Figure 5:
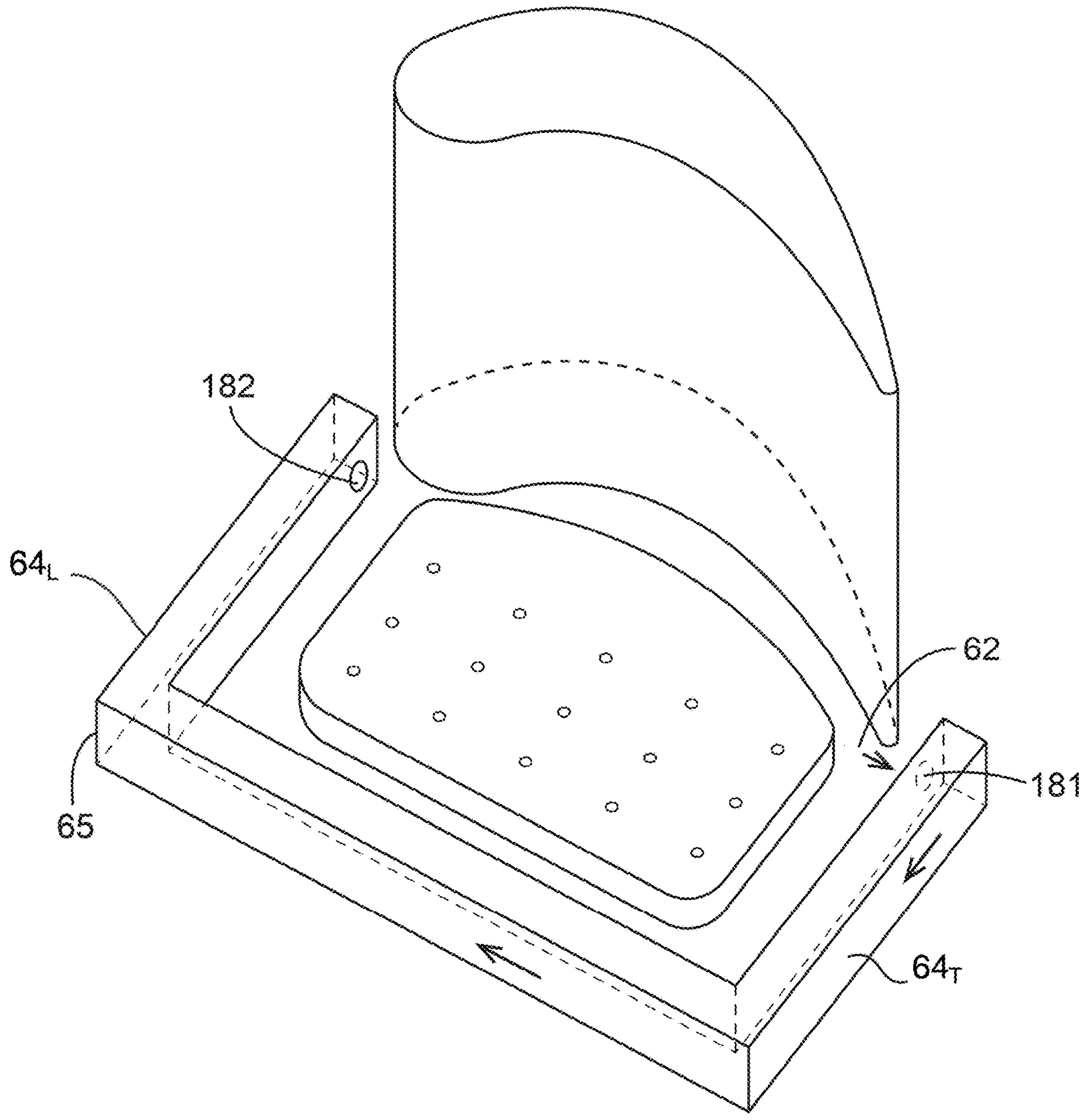
FIG. 5 is a perspective view of a part of a stator vane in the first embodiment.

FIG. 5 is a perspective view of a part of a stator vane in the first embodiment. In the present embodiment, the air channel 142 is an intermediate air channel positioned on a downstream side of the leading end air channel 141 and also positioned between the leading end air channel 141 and a trailing end air channel 143 (described below). For example, in the insert 152 which is an intermediate insert, part of cooling air which is supplied to the inner air channel 162 through the air inlet 58 is jetted through the apertures 59 toward the inner surface of the middle part of the airfoil 51, and then is guided to flow in the radially inner direction through own outer air channel toward the inner shroud 60, then, as shown by FIG. 5, flows into the shroud edge passage inlet 181 of the inner shroud 60 (disposed on a trailing-side shroud edge $\mathbf{64}_T$). The cooling air then flows through the shroud edge passage 65 of the inner shroud 60 to cool the shroud edge 64 of the inner shroud 60, and then, flows into the shroud main body 62 of the inner shroud 60 through the shroud edge passage outlet 182 of the inner shroud 60 (disposed on a leading-side shroud edge $\mathbf{64}_L$). In similar manner to the outer shroud 70, the cooling air is jetted from the air holes of the impingement plate 63 to cool the radially outer wall of the inner shroud 60 which has a gas path surface facing radially outer side and facing the hot gas path.

In the present embodiment, part of cooling air which is jetted from the leading end inner air channel 161 toward the inner surface of the leading end part of the airfoil 51 is guided to flow in the radially outer direction through the outer air channel 57 toward the outer shroud 70. Also, part of cooling air which is jetted from the intermediate inner air channel 162 toward the inner surface of the intermediate part of the airfoil 51 is guided to flow in the radially inner direction through the outer air channel 57 toward the inner shroud 60 (here, the air channel 141 is “one air channel” and the air channel 142 is “another air channel”). However, the structure of the stator vane is not limited to this embodiment. Part of cooling air which is jetted from the leading end inner air channel 161 toward the inner surface of the leading end part of the airfoil 51 may be guided to flow in the radially inner direction through the outer air channel 57 toward the inner shroud 60. Also, part of cooling air which is jetted from the intermediate inner air channel 162 toward the inner surface of the intermediate part of the airfoil 51 may be guided to flow in the radially outer direction through the outer air channel 57 toward the outer shroud 70 (here, the air channel 141 is “another air channel” and the air channel 142 is “one air channel”). Such modification will be further described below as another embodiment.

In some embodiments of this disclosure, as shown by FIG. 2, the air channel 143 is a trailing end air channel positioned at a downstream end of the vane body 51. The trailing end air channel 142 also includes an airfoil cooling structure 154 on a downstream side of the insert 153. The airfoil cooling structure 154 includes a passage inside of which a plurality of pin fins 164 are disposed. For example, in the insert 153 which is a trailing end insert, part of cooling air which is supplied to the inner air channel (trailing end inner air channel) 163 through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

Figure 6:
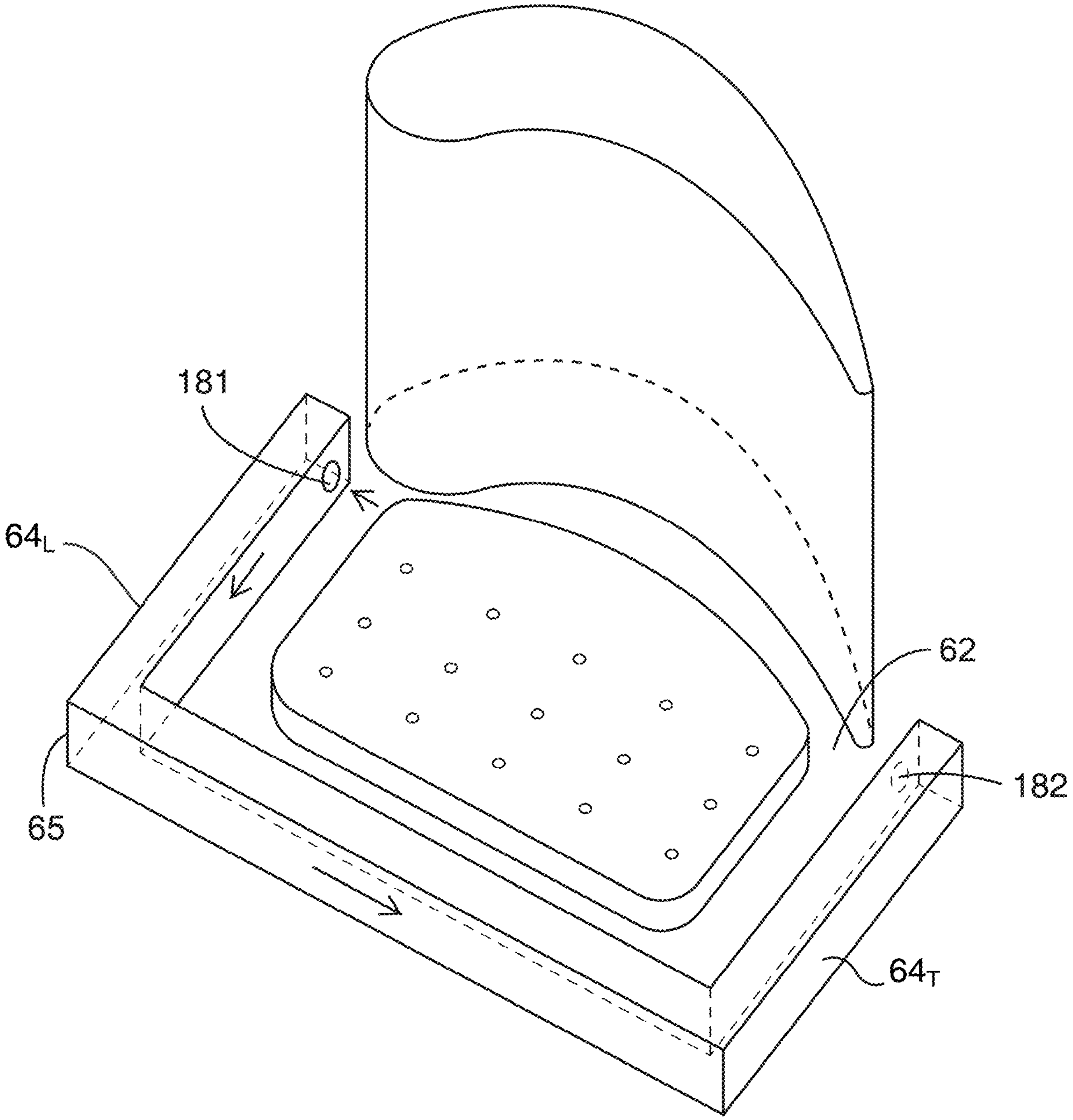
FIG. 6 is a perspective view of a part of a stator vane in another embodiment.

FIG. 6 is a perspective view of a part of a stator vane in another embodiment. As shown by FIG. 6, in this embodiment, the shroud edge passage inlet 181 of the inner shroud 60 is disposed on the leading-side shroud edge $\mathbf{64}_L$. Also, the shroud edge passage outlet 182 of the inner shroud 60 is disposed on the trailing-side shroud edge $\mathbf{64}_T$. Also, in this embodiment, the shroud edge passage inlet 171 of the outer shroud 70 is disposed on the trailing-side shroud edge $\mathbf{74}_T$. Also, the shroud edge passage outlet 172 of the outer shroud 70 is disposed on the leading-side shroud edge $\mathbf{74}_L$. In this embodiment, in the insert 151 which is the leading end insert, part of cooling air which is supplied to the inner air channel 161 through the air inlet 58 is jetted through the apertures 59 toward the inner surface of the leading end part of the airfoil 51, and then is guided to flow in the radially inner direction through the outer air channel 57 toward the inner shroud 60, then, as shown by FIG. 6, flows into the shroud edge passage inlet 181 of the inner shroud 60 (disposed on the leading-side shroud edge $\mathbf{64}_L$). The cooling air then flows through the shroud edge passage 65 of the inner shroud 60 to cool the shroud edge 64 of the inner shroud 60, and then, flows into the shroud main body 62 of the inner shroud 60 through the shroud edge passage outlet 182 of the inner shroud 60 (disposed on the trailing-side shroud edge $\mathbf{64}_T$). Also, in this embodiment, in the insert 152 which is an intermediate insert, part of cooling air which is supplied to the inner air channel 162 through the air inlet 58 is jetted through the apertures 59 toward the inner surface of the middle part of the airfoil 51, and then is guided to flow in the radially outer direction through the outer air channel toward the outer shroud 70, then flows into the shroud edge passage inlet 171 of the outer shroud 70 (disposed on the trailing-side shroud edge $\mathbf{74}_T$). The cooling air then flows through the shroud edge passage 75 of the outer shroud 70 to cool the shroud edge 74 of the outer shroud 70, and then, flows into the shroud main body 72 of the outer shroud 70 through the shroud edge passage outlet 172 of the outer shroud 70 (disposed on the leading-side shroud edge $\mathbf{74}_L$).

Cooling Method

Figure 7:
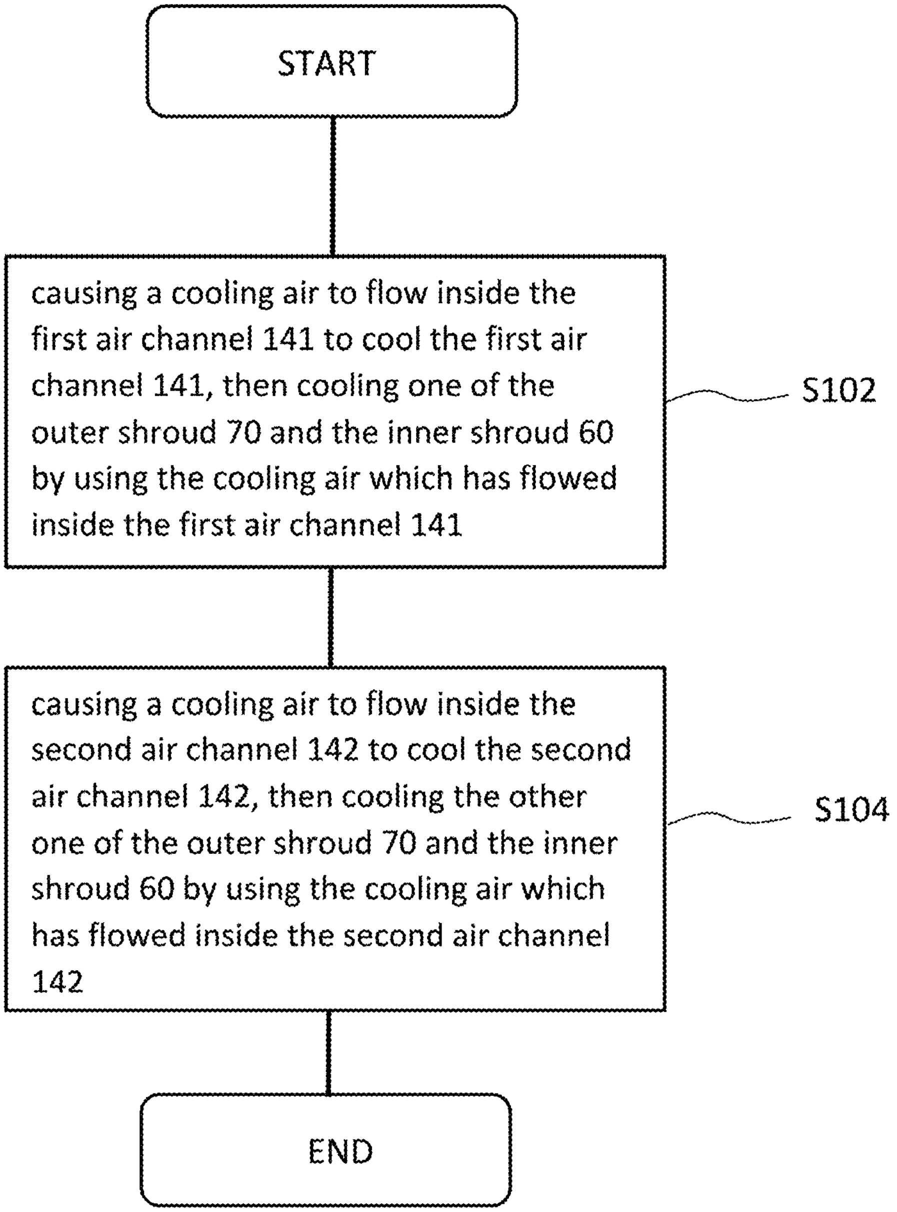
FIG. 7 is a flowchart illustrating a cooling method of the stator vane of the first embodiment.

Next, a cooling method of a stator vane of the first embodiment is described. FIG. 7 is a flowchart illustrating a cooling method of the stator vane of the first embodiment. As shown by FIG. 7, at a step S102, part of cooling air is caused to flow into the leading end air channel 141 to cool the leading end air channel 141. The cooling air is jetted from the leading end inner air channel 161 through the apertures 59 of the insert 151 toward the inner surface of the leading end part of the airfoil 51, and is guided in either one of the radially outer direction or the radially inner direction through the outer air channel 57 toward the outer shroud 70 or the inner shroud 60 to cool the outer shroud 70 or the inner shroud 60.

At a step S104, part of cooling air is caused to flow into the intermediate air channel 142 to cool the intermediate air channel 142. The cooling air is jetted from the intermediate inner air channel 162 through the apertures 59 of the insert 152 toward the inner surface of the intermediate part of the airfoil 51, and is guided in the other one of the radially outer direction or in the radially inner direction through the outer air channel 57 toward the outer shroud 70 or the inner shroud 60 to cool the other one of the outer shroud 70 or the inner shroud 60.

Figure 8:
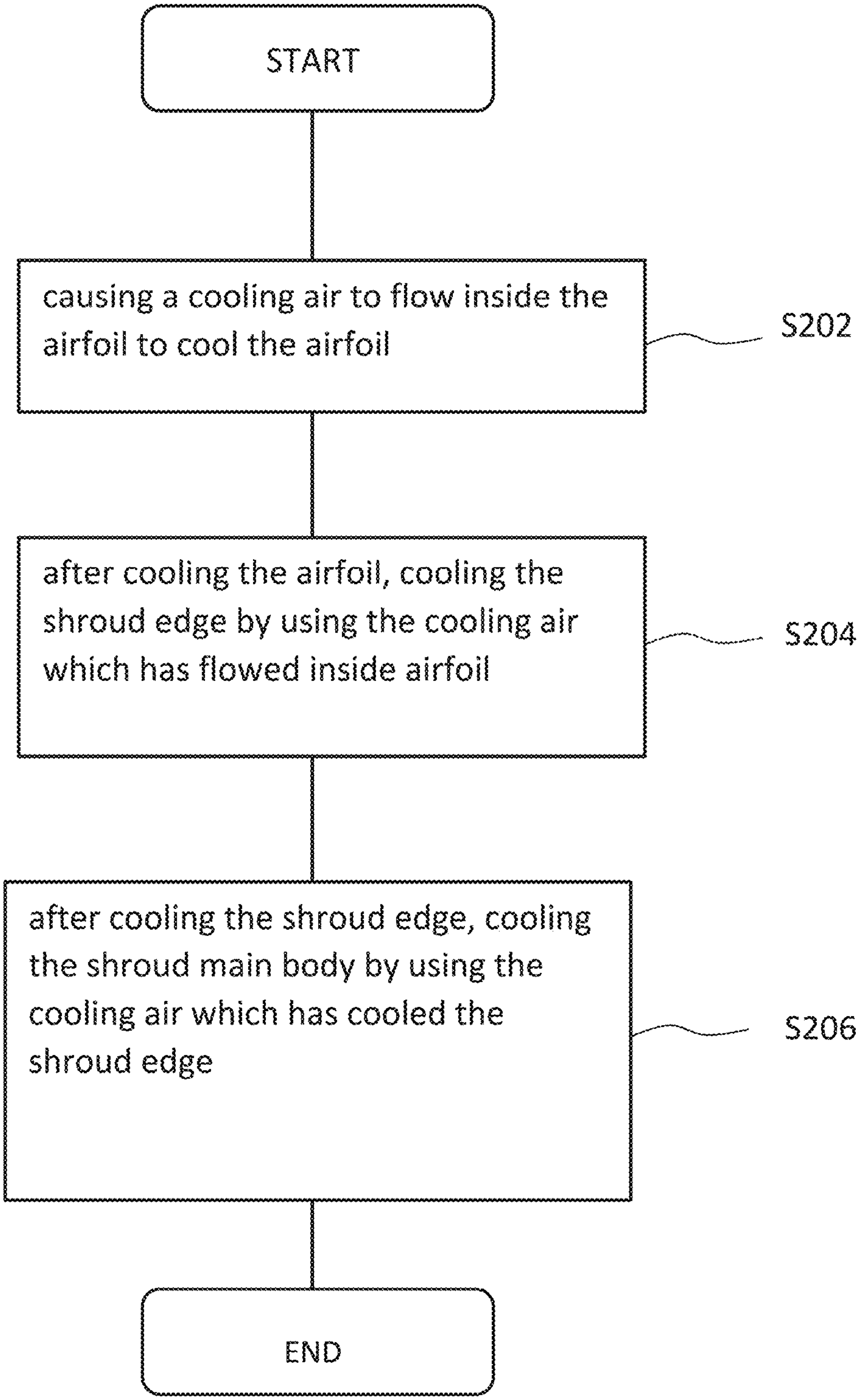
FIG. 8 is a flowchart illustrating a cooling method of the stator vane of the second embodiment.
Figure 9:
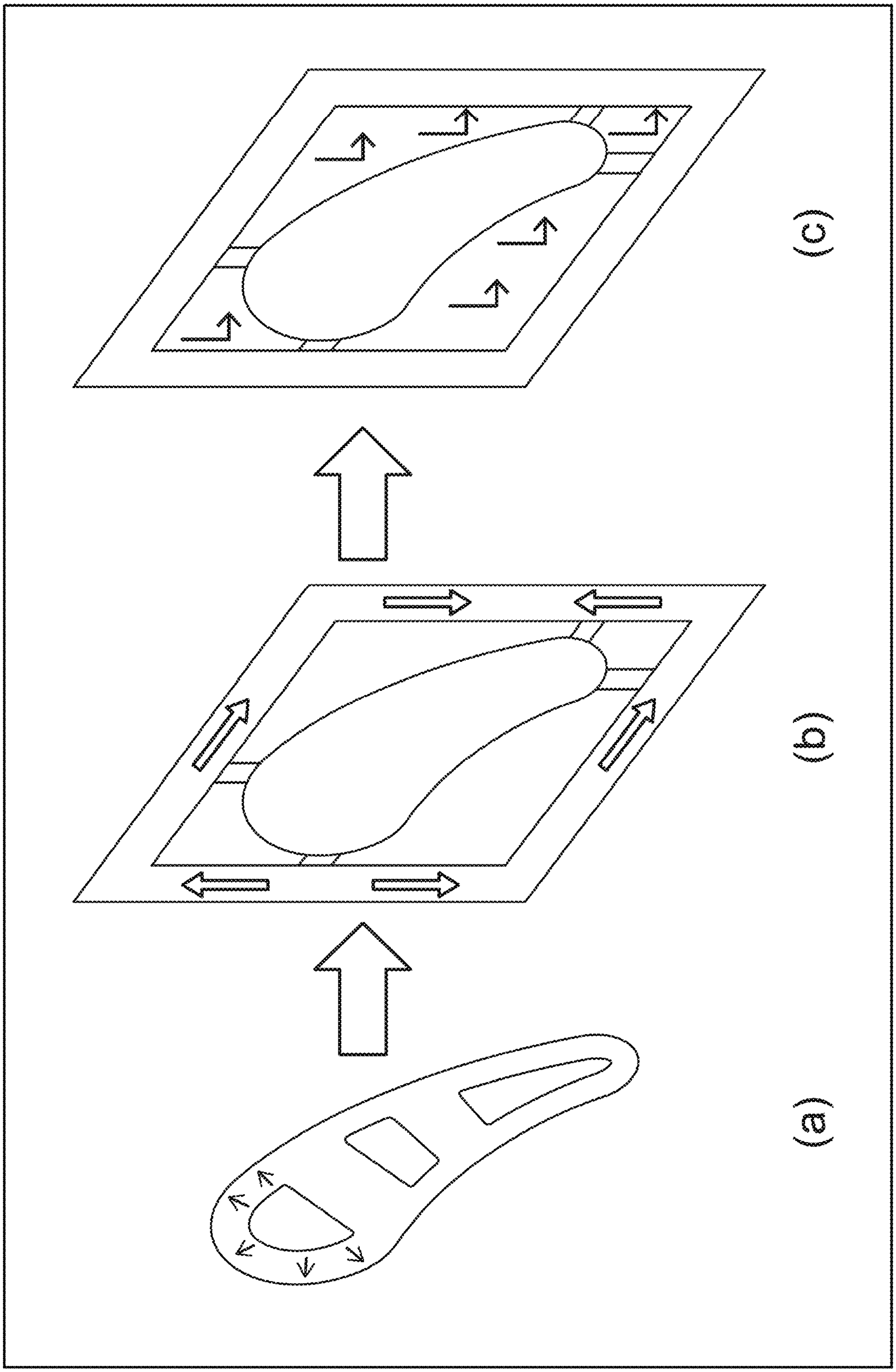
FIG. 9 schematically illustrates cooling steps of the second embodiment.

Next, a cooling method of a stator vane of the second embodiment is described. FIG. 8 is a flowchart illustrating a cooling method of the stator vane of the second embodiment. This method is described by using the air channel 141 and the outer shroud 70 as examples. FIG. 9 schematically illustrates cooling steps of the second embodiment. As shown by FIG. 8 and FIG. 9(*a*), at a step S202, part of cooling air is caused to flow into the inner air channel 161 of the insert 151 through the air inlet 58. The cooling air is then jetted through the apertures 59 toward the inner surface of the leading end part of the airfoil 51 to cool the airfoil 51, and then, flows in the radially outer direction through the outer air channel 57. In some of this embodiment, the part of cooling air which is caused to flow into the inner air channel 161 may be introduced from the forced air cooling system.

As shown by FIG. 9(*b*), at a step S204, the cooling air is caused to flow into the shroud edge passage 75 through the shroud edge passage inlet 171. The cooling air flows along and through the shroud edge passage 75 to cool the shroud edge 75.

As shown by FIG. 9(*c*), at a step S206, the cooling air flows into the outer region of the shroud main body 72 and is jetted through the air holes 79 toward the radially outer surface of the radially inner wall 81 for impingement cooling of the radially outer surface of the radially inner plate 81 to cool the shroud main body 72.

Figure 10:
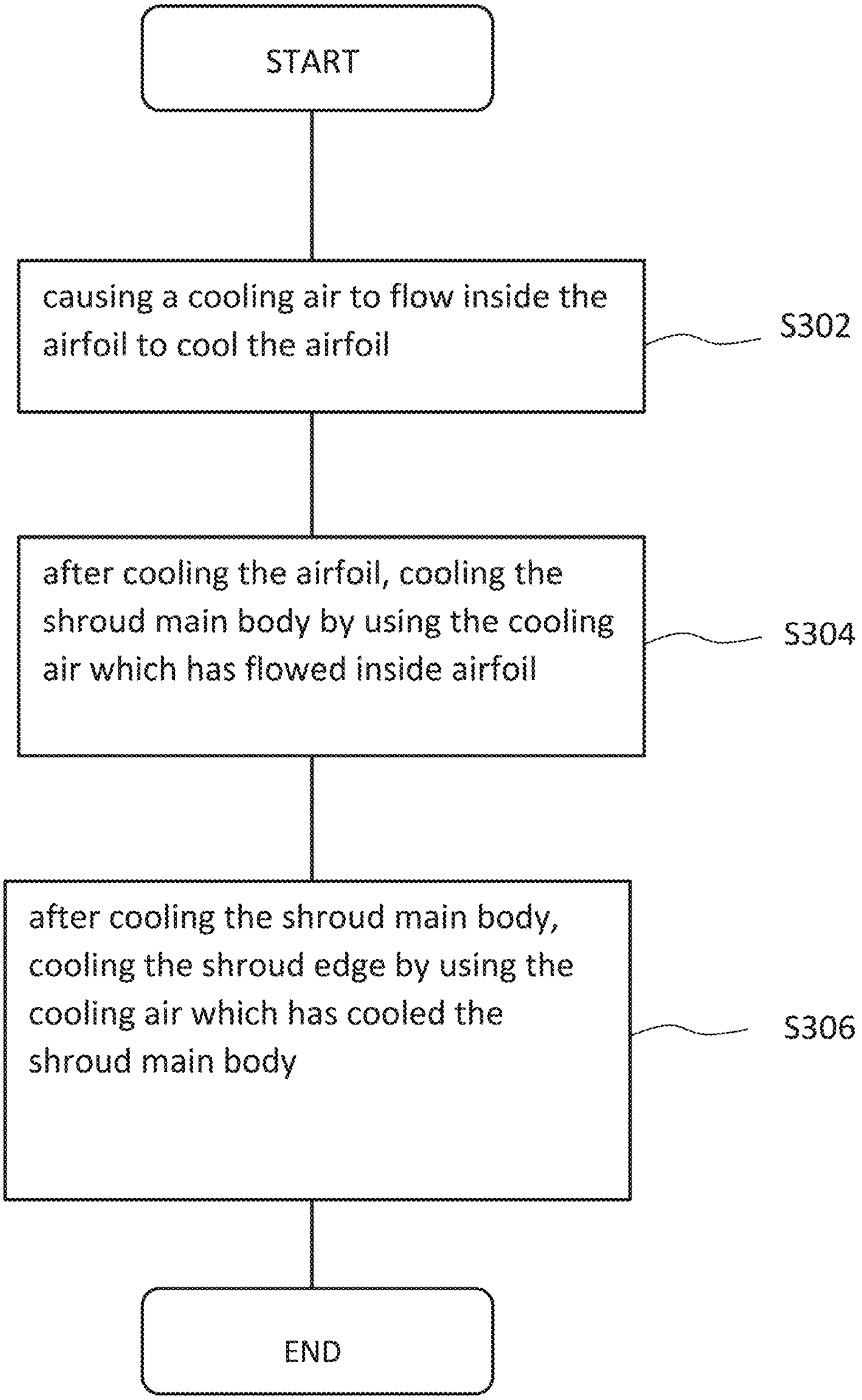
FIG. 10 is a flowchart illustrating a cooling method of the stator vane of the third embodiment.

Next, a cooling method of a stator vane of third embodiment is described. FIG. 10 is a flowchart illustrating a cooling method of the stator vane of the third embodiment. As shown by FIG. 10, at a step S302, in at least one of the air channels, part of cooling air is caused to flow into the inner air channel of the insert through the air inlet. The cooling air is then jetted through the apertures toward the inner surface of the leading end part of the airfoil to cool the airfoil, and then, flows in the radially outer direction through the outer air channel. In some of this embodiment, the part of cooling air which is caused to flow into the inner air channel may be introduced from the forced air cooling system.

At a step S304, the cooling air is caused to flow into the outer region of the shroud main body and is jetted through the air holes toward the radially outer surface of the radially inner wall for impingement cooling of the radially outer surface of the radially inner wall to cool the shroud main body.

At a step S306, the cooling air is caused to flow into shroud edge passage through the shroud edge passage inlet. The cooling air flows along and through the shroud edge passage to cool the shroud edge. In some of this embodiment, the cooling air may be returned to the forced air cooling system through the shroud edge passage outlet.

Figure 11:
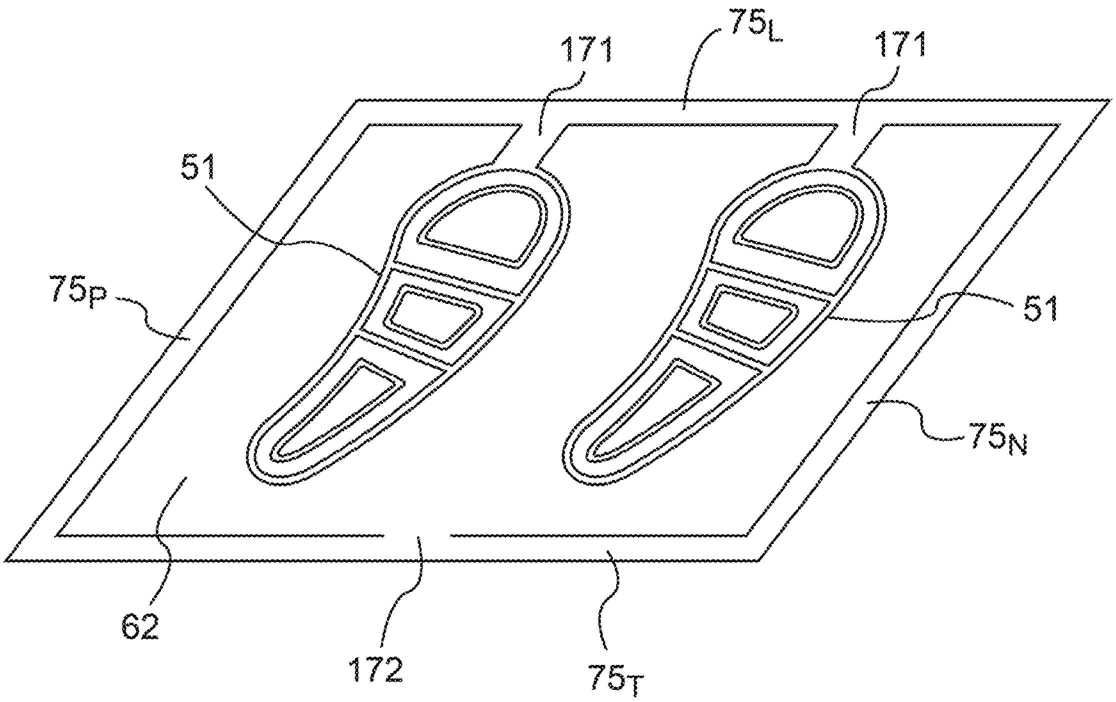
FIG. 11 is a schematic sectional view of a stator vane according to the fourth embodiment.

Next, the fourth embodiment of the present application is described below. FIG. 11 is a schematic sectional view of a stator vane according to the fourth embodiment. As shown by FIG. 11, in the fourth embodiment, a plurality of the airfoils 51 (two airfoils in this embodiment) are surrounded by the shroud edge passages $\mathbf{75}_L$, $\mathbf{75}_T$, $\mathbf{75}_N$, $\mathbf{75}_P$. Differently from the first embodiment (FIG. 3), two shroud edge passage inlets 171 are provided to the leading-side shroud edge passage $\mathbf{75}_L$.

The respective outer air channels which is a space between the insert 151 and the inner surface of the leading end part of the two airfoils 51 are communicated with the respective shroud edge passage inlets 171 of the leading-side shroud edge passage $\mathbf{75}_L$ through the respective air passages provided in an outer end of the respective outer air channels of the respective airfoils 51. The cooling air flows into the leading-side shroud edge passage $\mathbf{75}_L$ through the respective shroud edge passage inlets 171 and flows through the suction-side shroud edge passage $\mathbf{75}_N$, or the pressure-side shroud edge passages $\mathbf{75}_P$, then flows into the outer region of the shroud main body 72 through the shroud edge passage outlet 172.

In the above embodiments, the vane body (airfoil) includes three air channels 141, 142, 143. However, the number of the air channels included in the vane body (airfoil) is not limited to three. The vane body (airfoil) may include different number of air channels such as two, four, five or more. In such a modified embodiment, each air channel may be connected to the outer shroud or the inner shroud.

Figure 12B:
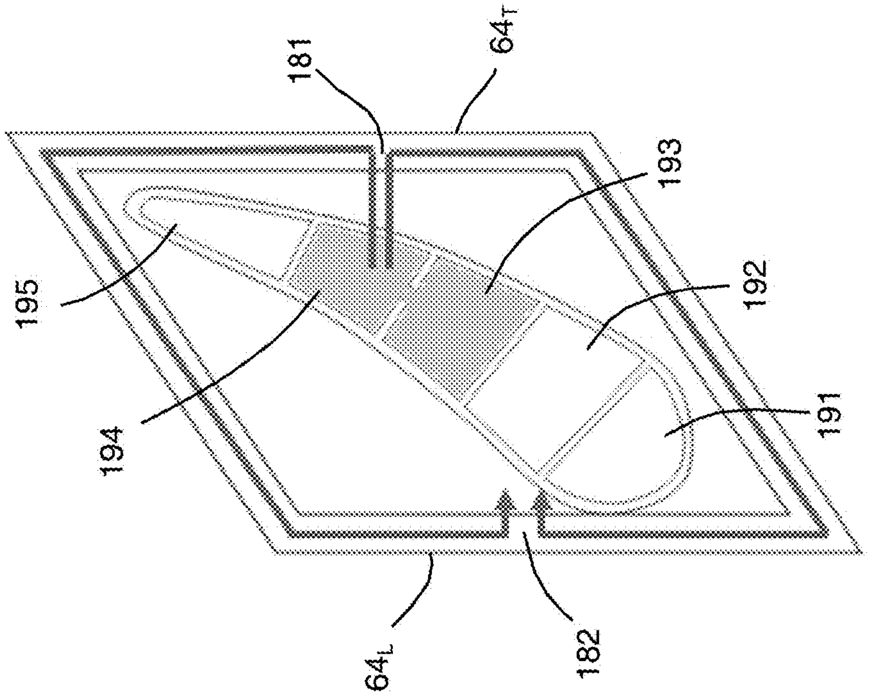
FIGS. 12A and 12B are respectively a schematic sectional view of a stator vane according to the fifth embodiment.
Figure 12A:
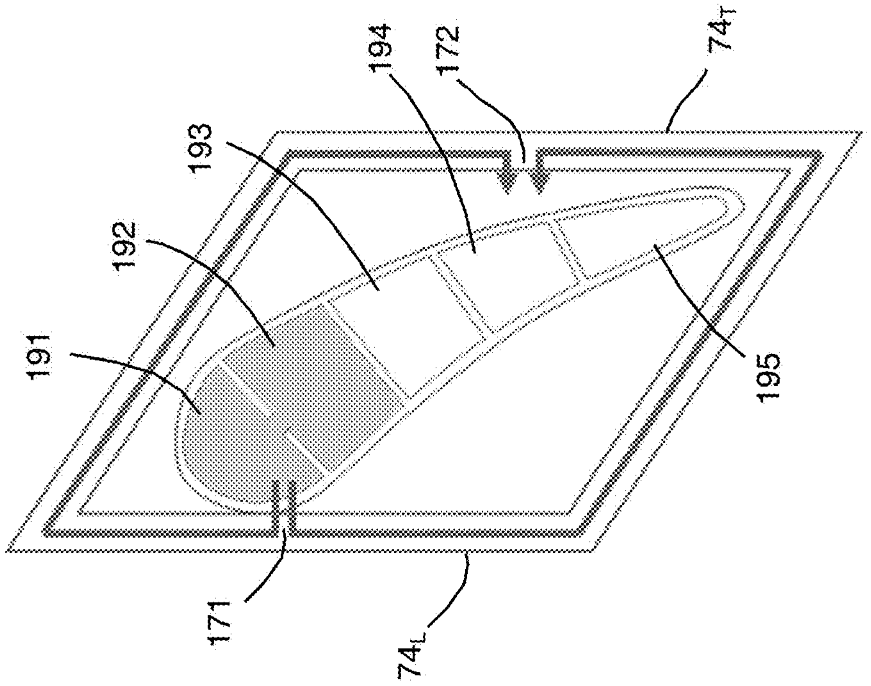

For example, the fifth embodiment of the present application is described below. FIGS. 12A and 12B are respectively a schematic sectional view of a stator vane according to the fifth embodiment. As shown by FIGS. 12A and 12B, in the fifth embodiment, the vane body (airfoil) includes air channels 191, 192, 193, 194 and 195 located in this order from an upstream end to a downstream end thereof with respect to the flow of hot gas in the turbine. The air channels 191, 192, 193, 194 and 195 respectively includes an insert and an inner air channel (not shown). As shown by FIG. 12A, the first air channel 191 and the second air channel 192 are communicated with the shroud edge passage inlet 171 of the outer shroud 70 disposed at the leading-side shroud edge $\mathbf{74}_L$ (here, the first air channel 191 is "one air channel" and the second air channel 192 is "one air channel"). Also, as shown by FIG. 12B, the third air channel 193 and the fourth air channel 194 are communicated with the shroud edge passage inlet 181 of the inner shroud 60 disposed at the trailing-side shroud edge $\mathbf{64}_T$ (here, the third air channel 193 is "another air channel" and the fourth air channel 194 is "another air channel").

In the present embodiment, part of cooling air which is introduced in the first air channel 191 flows inside the first air channel 191 and is jetted from a first inner air channel through the apertures 59 of a first insert toward the inner surface of the leading end part of the airfoil 51, then is guided to flow in the radially outer direction through the outer air channel 57 toward the outer shroud 70. Similarly, part of cooling air which is jetted from a second inner air channel of the second air channel 192 through the apertures 59 of a second insert toward the inner surface of the intermediate part of the airfoil 51 is guided to flow in the radially outer direction through the own outer air channel 57 toward the outer shroud 70. Then, the cooling air is guided into the shroud edge passage inlet 171 of the outer shroud 70.

In the present embodiment, part of cooling air which is jetted from a third inner air channel of the third air channel 193 through the apertures 59 of a third insert toward the inner surface of the intermediate part of the airfoil 51 is guided to flow in the radially inner direction through the own outer air channel 57 toward the inner shroud 60. Also, part of cooling air which is jetted from a fourth inner air channel of the fourth air channel 194 through the apertures 59 of a fourth insert toward the inner surface of the intermediate part of the airfoil 51 is guided to flow in the radially inner direction through the own outer air channel 57 toward the inner shroud 60. Then, the cooling air is guided into the shroud edge passage inlet 181 of the inner shroud 60.

The fifth air channel 195 is a trailing end air channel positioned at a downstream end of the vane body 51. As described above, in the fifth air channel 195, part of cooling air which is supplied to a fifth inner air channel through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

The structure of the stator vane is not limited to this embodiment. As an alternative embodiment, the shroud edge passage inlet 171 of the outer shroud 70 may be disposed at the trailing-side shroud edge $\mathbf{74}_T$ and the shroud edge passage outlet 172 of the outer shroud 70 may be disposed at the leading-side shroud edge $\mathbf{74}_L$. Also, the shroud edge passage inlet 181 of the inner shroud 60 may be disposed at the leading-side shroud edge $\mathbf{64}_L$ and the shroud edge passage outlet 182 of the inner shroud 60 is disposed at the trailing-side shroud edge $\mathbf{64}_T$. In this embodiment, the first air channel 191 and the second air channel 192 are communicated with the shroud edge passage inlet 181 of the inner shroud 60 disposed at the leading-side shroud edge $\mathbf{64}_L$. Also, the third air channel 193 and the fourth air channel 194 are communicated with the shroud edge passage inlet 171 of the outer shroud 70 disposed at the trailing-side shroud edge $\mathbf{74}_T$.

Figure 13B:
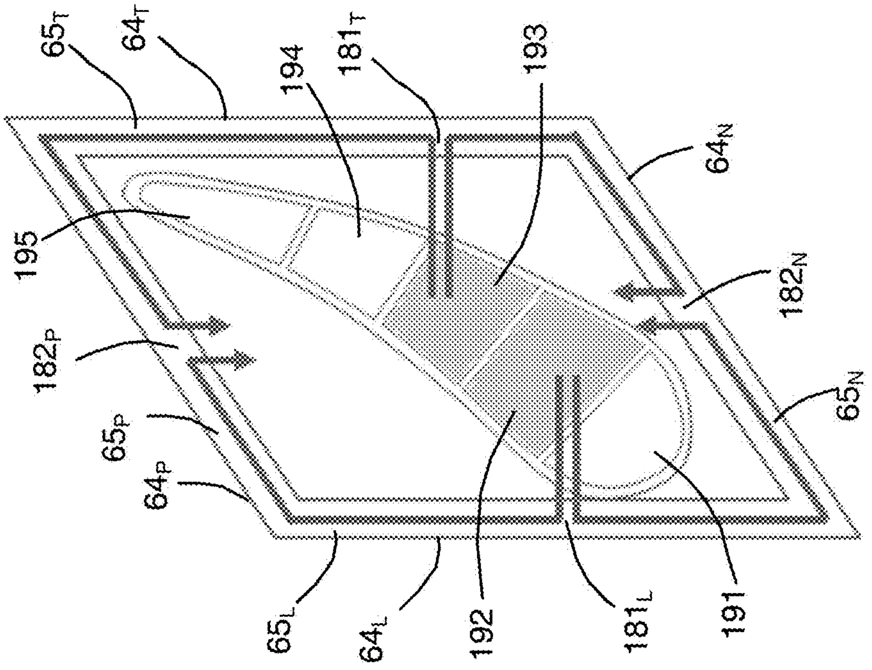
FIGS. 13A and 13B are respectively a schematic sectional view of a stator vane according to the sixth embodiment.
Figure 13A:
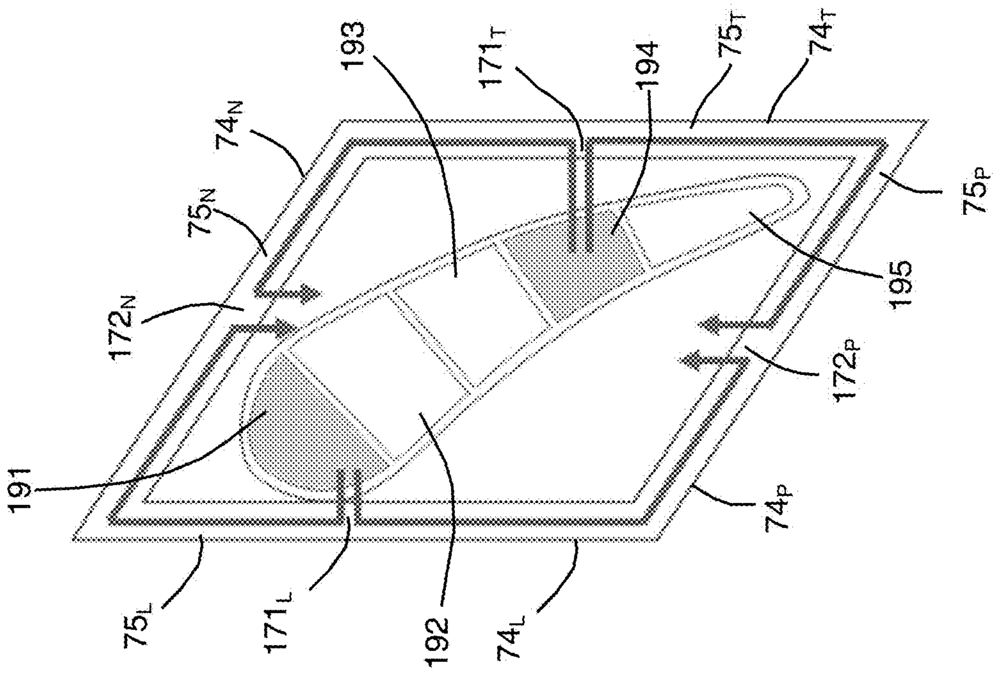

Next, the sixth embodiment of the present application is described below. FIGS. 13A and 13B are respectively a schematic sectional view of a stator vane according to the sixth embodiment. In this embodiment, the outer shroud 70 includes two shroud edge passage inlets (a leading-side shroud edge passage inlet $\mathbf{171}_L$ and a trailing-side shroud edge passage inlet $\mathbf{171}_T$), and two shroud edge passage outlets (a pressure-side shroud edge passage outlet $\mathbf{172}_P$ and a suction-side shroud edge passage outlet $\mathbf{172}_N$). The leading-side shroud edge passage inlet $\mathbf{171}_L$ is provided to the leading-side shroud edge $\mathbf{74}_L$. The trailing-side shroud edge passage inlet $\mathbf{171}_T$ is provided to the trailing-side shroud edge $\mathbf{74}_T$. The pressure-side shroud edge passage outlet $\mathbf{172}_P$ is provided to the pressure-side shroud edge $\mathbf{74}_P$. The suction-side shroud edge passage outlet $\mathbf{172}_N$ is provided to the suction-side shroud edge $\mathbf{74}_N$. The air channels 191, 192, 193, 194 and 195 respectively includes an insert and an inner air channel (not shown).

In this embodiment, the inner shroud 60 includes two shroud edge passage inlets (a leading-side shroud edge passage inlet $\mathbf{181}_L$ and a trailing-side shroud edge passage inlet $\mathbf{181}_T$), and two shroud edge passage outlets (a pressure-side shroud edge passage outlet $\mathbf{182}_P$ and a suction-side shroud edge passage outlet $\mathbf{182}_N$). The leading-side shroud edge passage inlet $\mathbf{181}_L$ is provided to the leading-side shroud edge $\mathbf{64}_L$. The trailing-side shroud edge passage inlet $\mathbf{181}_T$ is provided to the trailing-side shroud edge $\mathbf{64}_T$. The pressure-side shroud edge passage outlet $\mathbf{182}_P$ is provided to the pressure-side shroud edge $\mathbf{64}_P$. The suction-side shroud edge passage outlet $\mathbf{182}_N$ is provided to the suction-side shroud edge $\mathbf{64}_N$.

As shown by FIG. 13A, the first air channel 191 is communicated with the shroud edge passage inlet $\mathbf{171}_L$ of the outer shroud 70 disposed at the leading-side shroud edge $\mathbf{74}_L$ (here, the first air channel 191 is “one air channel”). Also, the fourth air channel 194 is communicated with the shroud edge passage inlet $\mathbf{171}_T$ of the outer shroud 70 disposed at the trailing-side shroud edge $\mathbf{74}_T$ (here, the fourth air channel 194 is “one air channel”). As shown by FIG. 13B, the second air channel 192 is communicated with the shroud edge passage inlet $\mathbf{181}_L$ of the inner shroud 60 disposed at the leading-side shroud edge $\mathbf{64}_L$ (here, the second air channel 192 is “another air channel”). The third air channel 193 is communicated with the shroud edge passage inlet $\mathbf{181}_T$ of the inner shroud 60 disposed at the trailing-side shroud edge $\mathbf{64}_T$ (here, the third air channel 193 is “another air channel”).

In this embodiment, for example, part of cooling air which is supplied to the first air channel 191 is jetted from a first inner air channel through the apertures 59 of a first insert toward the inner surface of the leading end part of the airfoil 51, and then is guided to flow in the radially outer direction through the own outer air channel toward the outer shroud 70, then, as shown by FIG. 13A, flows into the leading-side shroud edge passage inlet $\mathbf{171}_L$. The cooling air then flows along the leading-side shroud edge passage $\mathbf{75}_L$. Then, the cooling air flows along the pressure-side shroud edge passage $\mathbf{75}_P$, then flows out from pressure-side shroud edge passage outlet $\mathbf{172}_P$, also flows along the suction-side shroud edge passage $\mathbf{75}_N$, then flows out from pressure-side shroud edge passage outlet $\mathbf{172}_N$. In this embodiment, for example, part of cooling air which is supplied to the fourth air channel 194 is jetted from a fourth inner air channel through the apertures 59 of a fourth insert toward the inner surface of the middle end part of the airfoil 51, and then is guided to flow in the radially outer direction through the own outer air channel toward the outer shroud 70, then, as shown by FIG. 13A, flows into the trailing-side shroud edge passage inlet $\mathbf{171}_T$. The cooling air then flows along the trailing-side shroud edge passage $\mathbf{75}_T$. Then, the cooling air flows along the pressure-side shroud edge passage $\mathbf{75}_P$, then flows out from pressure-side shroud edge passage outlet $\mathbf{172}_P$, also flows along the suction-side shroud edge passage $\mathbf{75}_N$, then flows out from pressure-side shroud edge passage outlet $\mathbf{172}_N$.

In this embodiment, for example, part of cooling air which is supplied to the second air channel 192 is jetted from a second inner air channel through the apertures 59 of a second insert toward the inner surface of the middle part of the airfoil 51, and then is guided to flow in the radially inner direction through the own outer air channel toward the inner shroud 60, then, as shown by FIG. 13B, flows into the leading-side shroud edge passage inlet $\mathbf{181}_L$. The cooling air then flows along the leading-side shroud edge passage $\mathbf{65}_L$. Then, the cooling air flows along the pressure-side shroud edge passage $\mathbf{65}_P$, then flows out from pressure-side shroud edge passage outlet $\mathbf{182}_P$, also flows along the suction-side shroud edge passage $\mathbf{65}_N$, then flows out from pressure-side shroud edge passage outlet $\mathbf{182}_N$. In this embodiment, for example, part of cooling air which is supplied to the third air channel 193 is jetted from a third inner air channel through the apertures 59 of a third insert toward the inner surface of the middle end part of the airfoil 51, and then is guided to flow in the radially inner direction through the own outer air channel toward the inner shroud 60, then, as shown by FIG. 13B, flows into the trailing-side shroud edge passage inlet $\mathbf{181}_T$. The cooling air then flows along the trailing-side shroud edge passage $\mathbf{65}_T$. Then, the cooling air flows along the pressure-side shroud edge passage $\mathbf{65}_P$, then flows out from pressure-side shroud edge passage outlet $\mathbf{182}_P$, also flows along the suction-side shroud edge passage $\mathbf{65}_N$, then flows out from pressure-side shroud edge passage outlet $\mathbf{182}_N$.

The fifth air channel 195 is a trailing end air channel positioned at a downstream end of the vane body 51. As described above, in the fifth air channel 195, part of cooling air which is supplied to a fifth inner air channel through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

The structure of the stator vane is not limited to this embodiment. As an alternative embodiment, the first air channel 191 may be communicated with the shroud edge passage inlet $\mathbf{181}_L$ of the inner shroud 60 disposed at the leading-side shroud edge $\mathbf{64}_L$. Also, the fourth air channel 194 may be communicated with the shroud edge passage inlet $181_T$ of the inner shroud 60 disposed at the trailing-side shroud edge $64_T$. Also, the second air channel 192 may be communicated with the shroud edge passage inlet $171_L$ of the outer shroud 70 disposed at the leading-side shroud edge $74_L$. The third air channel 193 is communicated with the shroud edge passage inlet $171_T$ of the outer shroud 70 disposed at the trailing-side shroud edge $74_T$.

The present disclosure is not limited to the above-described embodiment and can be implemented in various embodiments. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

10 gas turbine
20 turbine
22 turbine casing
24 rotor shaft
26 turbine rotor
Ar Axis
30 combustor
50 stator vane
51 vane body (airfoil)
$51_P$ partition walls
52 leading edge
53 trailing edge
54 suction-side surface
55 pressure-side surface
56 intake manifold
57 outer air channel
58 air inlet
59 apertures
141, 142, 143 air channel
151, 152, 153 insert
161, 162, 163 inner air channel
191, 192, 193, 194, 195 air channel
154 airfoil cooling structure
164 pin fins
60 inner shroud
70 outer shroud
62, 72 shroud main body
63, 73 impingement plate
64, 74 shroud edge
65, 75 shroud edge passage
S hollow space
171 shroud edge passage inlet
172 shroud edge passage outlet
175 turbulator
76 peripheral wall
78 gas path surface
79 air holes
81 radially inner wall
82 radially outer wall
83 exit conduit
181 shroud edge passage inlet
182 shroud edge passage outlet

What is claimed is:

1. A vane for a turbine comprising:

an airfoil; and a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a one air channel and an another air channel, the airfoil comprises an air inlet configured to introduce cooling air from outside of the vane to the one air channel and the another air channel, the one air channel is communicated with one of the outer shroud and the inner shroud to cause the cooling air introduced to the one air channel to flow toward the one of the outer shroud and the inner shroud to cool the one of the outer shroud and the inner shroud, the another air channel is communicated with the other one of the outer shroud and the inner shroud to cause the cooling air introduced to the another air channel to flow toward the other one of the outer shroud and the inner shroud to cool the other one of the outer shroud and the inner shroud, and the outer shroud comprises an outer shroud main body and an outer shroud edge disposed on a circumference of the outer shroud main body to surround the outer shroud main body, the outer shroud edge comprising an outer shroud edge passage therein, the inner shroud comprises an inner shroud main body and an inner shroud edge disposed on a circumference of the inner shroud main body to surround the inner shroud main body, the inner shroud edge comprising an inner shroud edge passage therein, the one air channel is communicated with the outer shroud edge passage, and the another air channel is communicated with the inner shroud edge passage, wherein the one air channel is a leading end air channel positioned at an upstream end of the airfoil with respect to a flow of hot gas in the turbine, and wherein the another air channel is an air channel positioned on a downstream side of the leading end air channel.

2. The vane for a turbine according to claim 1, wherein the one air channel is communicated with the outer shroud such that the outer shroud is cooled by using the cooling air which has flowed inside the one air channel, and the another air channel is communicated with the inner shroud such that the inner shroud is cooled by using the cooling air which has flowed inside the another air channel.

3. The vane of the turbine according to claim 1, wherein the outer shroud edge comprises an outer shroud edge passage inlet disposed at a leading end portion of the outer shroud edge, and the one air channel is communicated with the outer shroud edge passage through the outer shroud edge passage inlet, and the inner shroud edge comprises an inner shroud edge passage inlet disposed at a trailing end portion of the inner shroud edge, and the another air channel is communicated with the inner shroud edge passage through the inner shroud edge passage inlet.

4. The vane of the turbine according to claim 1, wherein the outer shroud edge comprises an outer shroud edge passage inlet disposed at a leading end portion of the outer shroud edge, and the one air channel is communicated with the outer shroud edge passage through the outer shroud edge passage inlet, and the inner shroud edge comprises an inner shroud edge passage inlet disposed at a leading end portion of the inner shroud edge, and the another air channel is communicated with the inner shroud edge passage through the inner shroud edge passage inlet.

5. The vane of the turbine according to claim 1, wherein the airfoil further comprises a trailing end air channel positioned at a downstream end of the airfoil with respect to the flow of the hot gas in the turbine, the trailing end air channel extending along the radial direction of the turbine and having an outlet disposed at a downstream end thereof, the outlet being opened to a hot gas passage of the turbine such that cooling air flows inside the trailing end air channel to cool the trailing end air channel, then is ejected to the hot gas passage of the turbine through the outlet.

6. The vane of the turbine according to claim 1, wherein the air inlet is configured to be able to receive the cooling air extracted from an inside of a combustor casing and compressed by an external compressor, and the outer shroud and the inner shroud respectively comprise a discharging passage configured to be able to discharge the cooling air to the inside of the combustor casing.

7. The vane of the turbine according to claim 1, wherein the air inlet is configured to introduce the cooling air from the outside of the vane to the one air channel and the another air channel without going through the outer shroud nor the inner shroud.

8. A method of cooling a vane of a turbine, the turbine comprising an airfoil, a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a one air channel and an another air channel, wherein the method comprising steps of:

causing a cooling air to flow inside the one air channel to cool the one air channel, then cooling one of the outer shroud and the inner shroud by using the cooling air which has flowed inside the one air channel; and causing a cooling air to flow inside the another air channel to cool the another air channel, then cooling the other one of the outer shroud and the inner shroud by using the cooling air which has flowed inside the another air channel, wherein the outer shroud comprises an outer shroud main body and an outer shroud edge disposed on a circumference of the outer shroud main body to surround the outer shroud main body, the outer shroud edge comprising an outer shroud edge passage therein, the inner shroud comprises an inner shroud main body and an inner shroud edge disposed on a circumference of the inner shroud main body to surround the inner shroud main body, the inner shroud edge comprising an inner shroud edge passage therein, the cooling air which has flowed inside the one air channel is guided and introduced to the outer shroud edge passage, and the cooling air which has flowed inside the another air channel is guided and introduced to the inner shroud edge passage, wherein the one air channel is a leading end air channel positioned at an upstream end of the airfoil with respect to a flow of hot gas in the turbine, and wherein the another air channel is an air channel positioned on a downstream side of the leading end air channel.

9. The method of cooling the vane of the turbine according to claim 8, wherein the outer shroud is cooled by using the cooling air which has flowed inside the one air channel, and the inner shroud is cooled by using the cooling air which has flowed inside the another air channel.

10. The method of cooling the vane of the turbine according to claim 8, wherein the cooling air which has flowed inside the one air channel is guided and introduced to the outer shroud edge passage through a leading end portion of the outer shroud edge to cool the outer shroud edge, and the cooling air which has flowed inside the another air channel is guided and introduced to the inner shroud edge passage through a trailing end portion of the inner shroud edge to cool the inner shroud edge.

11. The method of cooling the vane of the turbine according to claim 8, wherein the cooling air which has flowed inside the one air channel is guided and introduced to the outer shroud edge passage through a leading end portion of the outer shroud edge to cool the outer shroud edge, and the cooling air which has flowed inside the another air channel is guided and introduced to the inner shroud edge passage through a leading end portion of the inner shroud edge to cool the inner shroud edge.

12. The method of cooling the vane of the turbine according to claim 8, wherein the airfoil further comprises a trailing end air channel positioned at a downstream end of the airfoil with respect to the flow of the hot gas in the turbine, the trailing end air channel extending along the radial direction of the turbine, the method further comprises:

causing a cooling air to flow inside the trailing end air channel to cool the trailing end air channel, then ejecting the cooling air which has flowed inside the trailing end air channel to a hot gas passage of the turbine through an outlet disposed at a downstream end of the trailing end air channel.

13. The method of cooling the vane of the turbine according to claim 8, further comprising:

introducing the cooling air from outside of the vane to the one air channel and the another air channel without going through the outer shroud nor the inner shroud.

14. The method of cooling the vane of the turbine according to claim 8, further comprising:

introducing the cooling air extracted from an inside of a combustor casing and compressed by an external compressor to the one air channel and the another air channel; and discharging the cooling air to the inside of the combustor casing from the outer shroud and the inner shroud.

15. A vane for a turbine comprising:

an airfoil; and a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a one air channel and an another air channel, the airfoil comprises an air inlet configured to introduce cooling air from outside of the vane to the one air channel and the another air channel, the one air channel is communicated with one of the outer shroud and the inner shroud to cause the cooling air introduced to the one air channel to flow toward the one of the outer shroud and the inner shroud to cool the one of the outer shroud and the inner shroud, the another air channel is communicated with the other one of the outer shroud and the inner shroud to cause the cooling air introduced to the another air channel to flow toward the other one of the outer shroud and the inner shroud to cool the other one of the outer shroud and the inner shroud, and the outer shroud comprises an outer shroud main body and an outer shroud edge disposed on a circumference of the outer shroud main body to surround the outer shroud main body, the outer shroud edge comprising an outer shroud edge passage therein, the inner shroud comprises an inner shroud main body and an inner shroud edge disposed on a circumference of the inner shroud main body to surround the inner shroud main body, the inner shroud edge comprising an inner shroud edge passage therein, the one air channel is communicated with the outer shroud edge passage, and the another air channel is communicated with the inner shroud edge passage, wherein the outer shroud edge comprises an outer shroud edge passage inlet disposed at a leading end portion of the outer shroud edge, and the one air channel is communicated with the outer shroud edge passage through the outer shroud edge passage inlet, and the inner shroud edge comprises an inner shroud edge passage inlet disposed at a trailing end portion of the inner shroud edge, and the another air channel is communicated with the inner shroud edge passage through the inner shroud edge passage inlet.

16. A vane for a turbine comprising:

an airfoil; and a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a one air channel and an another air channel, the airfoil comprises an air inlet configured to introduce cooling air from outside of the vane to the one air channel and the another air channel, the one air channel is communicated with one of the outer shroud and the inner shroud to cause the cooling air introduced to the one air channel to flow toward the one of the outer shroud and the inner shroud to cool the one of the outer shroud and the inner shroud, the another air channel is communicated with the other one of the outer shroud and the inner shroud to cause the cooling air introduced to the another air channel to flow toward the other one of the outer shroud and the inner shroud to cool the other one of the outer shroud and the inner shroud, and the outer shroud comprises an outer shroud main body and an outer shroud edge disposed on a circumference of the outer shroud main body to surround the outer shroud main body, the outer shroud edge comprising an outer shroud edge passage therein, the inner shroud comprises an inner shroud main body and an inner shroud edge disposed on a circumference of the inner shroud main body to surround the inner shroud main body, the inner shroud edge comprising an inner shroud edge passage therein, the one air channel is communicated with the outer shroud edge passage, and the another air channel is communicated with the inner shroud edge passage, wherein the outer shroud edge comprises an outer shroud edge passage inlet disposed at a leading end portion of the outer shroud edge, and the one air channel is communicated with the outer shroud edge passage through the outer shroud edge passage inlet, and the inner shroud edge comprises an inner shroud edge passage inlet disposed at a leading end portion of the inner shroud edge, and the another air channel is communicated with the inner shroud edge passage through the inner shroud edge passage inlet.

17. A vane for a turbine comprising:

an airfoil; and a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a one air channel and an another air channel, the airfoil comprises an air inlet configured to introduce cooling air from outside of the vane to the one air channel and the another air channel, the one air channel is communicated with one of the outer shroud and the inner shroud to cause the cooling air introduced to the one air channel to flow toward the one of the outer shroud and the inner shroud to cool the one of the outer shroud and the inner shroud, the another air channel is communicated with the other one of the outer shroud and the inner shroud to cause the cooling air introduced to the another air channel to flow toward the other one of the outer shroud and the inner shroud to cool the other one of the outer shroud and the inner shroud, and the outer shroud comprises an outer shroud main body and an outer shroud edge disposed on a circumference of the outer shroud main body to surround the outer shroud main body, the outer shroud edge comprising an outer shroud edge passage therein, the inner shroud comprises an inner shroud main body and an inner shroud edge disposed on a circumference of the inner shroud main body to surround the inner shroud main body, the inner shroud edge comprising an inner shroud edge passage therein, the one air channel is communicated with the outer shroud edge passage, and the another air channel is communicated with the inner shroud edge passage, wherein the air inlet is configured to introduce the cooling air from the outside of the vane to the one air channel and the another air channel without going through the outer shroud nor the inner shroud.

18. A method of cooling a vane of a turbine, the turbine comprising an airfoil, a shroud disposed at an end of the airfoil, the end being a radial end along a radial direction of the turbine, the shroud comprising an outer shroud disposed at a radially outer end of the airfoil in the radial direction of the turbine and an inner shroud disposed at a radially inner end of the airfoil in the radial direction of the turbine, wherein the airfoil comprises a plurality of air channels extending along the radial direction of the turbine, the air channels comprising a one air channel and an another air channel, wherein the method comprising steps of:

causing a cooling air to flow inside the one air channel to cool the one air channel, then cooling one of the outer shroud and the inner shroud by using the cooling air which has flowed inside the one air channel; and causing a cooling air to flow inside the another air channel to cool the another air channel, then cooling the other one of the outer shroud and the inner shroud by using the cooling air which has flowed inside the another air channel, wherein the outer shroud comprises an outer shroud main body and an outer shroud edge disposed on a circumference of the outer shroud main body to surround the outer shroud main body, the outer shroud edge comprising an outer shroud edge passage therein, the inner shroud comprises an inner shroud main body and an inner shroud edge disposed on a circumference of the inner shroud main body to surround the inner shroud main body, the inner shroud edge comprising an inner shroud edge passage therein, the cooling air which has flowed inside the one air channel is guided and introduced to the outer shroud edge passage, and the cooling air which has flowed inside the another air channel is guided and introduced to the inner shroud edge passage, wherein the method of cooling the vane of the turbine further comprises:

introducing the cooling air from outside of the vane to the one air channel and the another air channel without going through the outer shroud nor the inner shroud.

* * * * *